United States Patent

[11] 3,628,421

[72] Inventor Raymond L. George
 Schenectady, N.Y.
[21] Appl. No. 33,191
[22] Filed Apr. 30, 1970
[45] Patented Dec. 21, 1971
[73] Assignee General Electric Company

[54] BILATERAL HYDROMECHANICAL SERVOSYSTEM
 5 Claims, 1 Drawing Fig.
[52] U.S. Cl. .................................................. 91/358,
 91/388
[51] Int. Cl. ............................................. F15b 13/16
[50] Field of Search .......................................... 91/358,
 367, 368, 370, 383, 388

[56] References Cited
UNITED STATES PATENTS
3,433,126  3/1969  Hayner et al. ................. 91/388 X Primary Examiner—Edgar W. Geoghegan
Attorneys—Paul A. Frank, John F. Ahern, Julius J. Zaskalicky, Frank L. Neuhauser, Oscar B. Waddell and Joseph B. Forman ABSTRACT: A single control valve is utilized in the slave loop and master force feedback loop. Instabilities in the master loop due to the high gain required in the slave loop are eliminated by utilization of the actuator in master loop in cooperation with orifices to provide a dashpot in the master loop to suppress instabilities in the master loop.

PATENTED DEC 21 1971                                    3,628,421
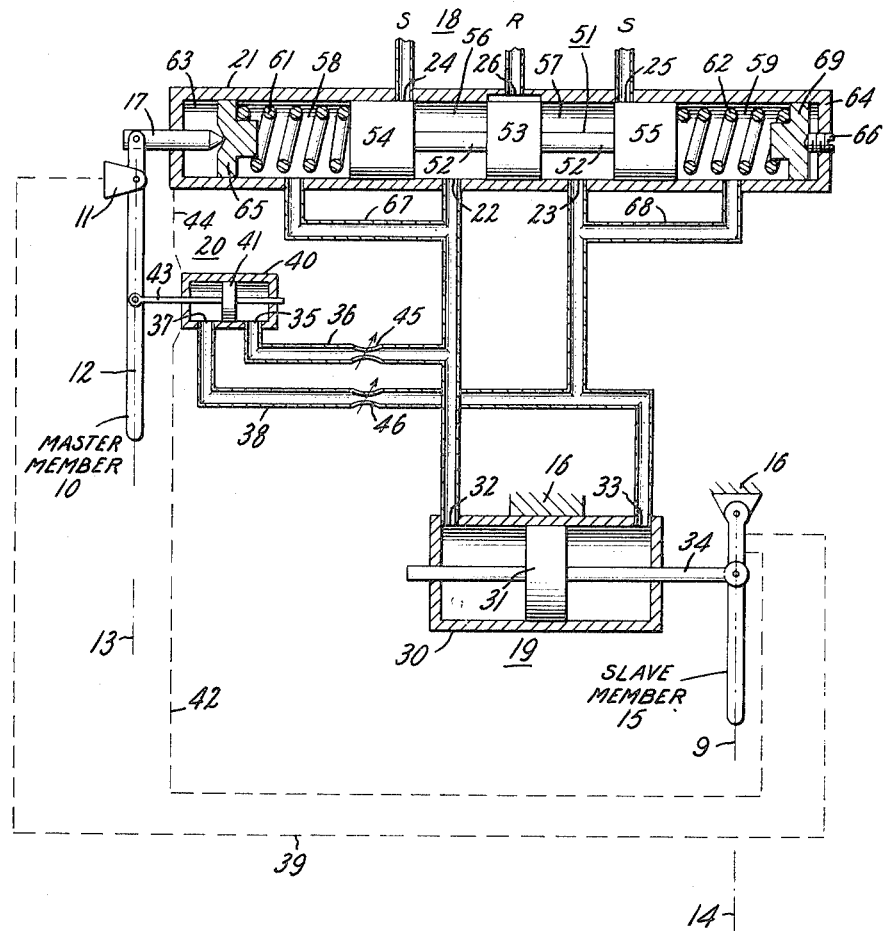
Inventor:
Raymond L. George,
by Julius J. Zaskalicky
His Attorney.

BILATERAL HYDROMECHANICAL SERVOSYSTEM

The present invention relates to bilateral servosystems using a single control valve for moving a slave member into correspondence with a master member and for reflecting force applied by the slave member back to the master member reduced in magnitude but opposite in direction to the initiating force.

One such single valve bilateral servosystem includes a master member, a hydraulic control valve, a slave actuator, and a slave member. The master member applies a small mechanical input to the control valve which develops a pressure differential at the output thereof. The output from the control valve drives the slave actuator which in turn causes the slave member to move. The movement of the slave member, reduced in magnitude, is in turn coupled back to the input circuit of the control valve circuit to reduce the mechanical input. Such a system also includes a master actuator responsive to the same pressure differential as the slave actuator but having smaller actuator area and therefore developing a smaller force. The master actuator is connected between the master and slave members and is hydraulically coupled in parallel with the slave actuator. The master actuator is oriented so as to provide force to the master member in a direction opposed to the direction of movement which produced the force on the slave member.

In such a system, the moment of inertia of the slave assembly is large in relation to the moment of inertia of the master assembly. Accordingly, high power gain is necessary in the control valve to provide sufficient power output for small mechanical power inputs. High-gain systems require stabilization over the range of operation of the system. Accordingly, the gain and phase relationships in the slave loop are designed to avoid regenerative feed back above a predetermined level which would produce oscillations and other instabilities in the loop. When the slave loop is so designed, the master loop including the master actuator and the control valve presents a problem in that the loop includes the high-gain path of power flow in the control valve and the master actuator is phased so as to provide regeneration from the output to the input circuit of the control valve. Such conditions lead to instabilities in the master loop in the form of self oscillations and the like.

The present invention is directed to the provision of simple and effective means for stabilizing the master actuator circuits of a bilateral servomechanical system such as described above.

The novel features which are believed to be characteristic of the present invention are set forth in the appended claims. The invention itself, however, together with further objects and advantages thereof may best be understood by reference to the following description taken in connection with the accompanying drawing.

Reference is now made to the drawing which shows a schematic diagram of a hydromechanical servosystem incorporating an embodiment of my invention. FIG. 1 shows a master member 10 pivoted intermediate the ends thereof about a master support member 11. The longitudinal axis 12 of the master member is aligned along a predetermined axis 13. Also shown is a slave member 15, one end of which is mounted to a slave support member 16 and the other end of which is adapted to apply force and torque to objects. The longitudinal axis of the slave member is aligned along another predetermined axis 14. Also provided are a hydromechanical control valve 18, which may be either a pressure valve or a flow valve, a slave hydraulic linear actuator 19 and a master hydraulic linear actuator 20. The control valve has an input shaft 17 movable with respect to the housing 21 or cylinder thereof and providing a mechanical input circuit to the control valve. One end of the master member 10 is pivotally connected to the input shaft 17 of the control valve 18 and the other end of the master member is adapted to be grasped by the hand of an operator. The control valve 17 is also provided with a pair of output ports 22 and 23 across which a pressure differential is developed by movement of the input shaft 17 in respect to the housing 21. Flow to the control valve is supplied through the source ports 24 and 25 and drain port 26 connected to the source and return ports of a pressure source, designated S and R, respectively. The control valve shown is connected as a hydromechanical pressure valve. It will be appreciated that flow valves may also be used in the system of the present invention. The hydromechanical pressure valve shown in the drawing is a conventional valve the details of which will be described below.

Slave actuator 19 includes a cylinder 30 and a piston 31 movable therein. A pair of ports 32 and 33 are provided, one at each end of the cylinder 30 for applying fluid to the ends of the cylinder 30 to cause the piston 31 to move in one direction and the other. Thus, the mechanical elements 30 and 31 of the slave actuator 19 move with respect to one another in response to the application of a fluid pressure differential between the ends of the cylinder. The cylinder 30 is connected to the same ground as the support 16 for the slave member. The stem 34 of the piston 31 is connected at a point intermediate the ends of the slave member 15 to provide torque thereto. The output from port 32 is applied to port 35 of the master actuator 20 over duct 36 and the output of port 33 is applied to the port 37 of the master actuator 20 over duct 38. A portion of the mechanical movement of the slave member 15 is coupled over the mechanical link 39 to the master support member 11. The phasing of the link 39 is such that the movement of the slave member 15 causes a movement of the support member 11 which reduces the mechanical input to the input circuit of the mechanical control valve 18. The master member 10 and slave member 15 are brought into orientation after an initial displacement of the longitudinal axis 12 of master member 10 from predetermined axis 13 sets in motion a sequence of operation in which mechanical input to the control valve 18 is amplified by the control valve and appears as a hydraulic fluid power output at the output terminals thereof. The hydraulic output is then converted into a mechanical power output by the slave actuator much larger than the mechanical input to the control valve to cause the slave member to apply pressure and perform useful work, etc. The output of the slave member in the form of a mechanical movement of longitudinal axis 9 thereof in relation to the other predetermined axis 14 is coupled back to the input circuit of the control valve 18 to maintain the slave member and master member in desired alignment in relation to their respective predetermined axes.

To achieve the high power output capability in the slave loop in response to a small mechanical power input to the control valve, it is necessary to provide a high-gain control valve. Providing such high-gain leads to instabilities in the slave loop. Stabilization in the slave loop takes the form of adjusting the amplitude and phase relations in the loop such that for the frequencies of operation of the system feedback is insufficient in phase and amplitude to produce instability.

In servosystems of the kind described, it is often desirable to have a portion of the applied force or torque fed back to the master member so that the operator can feel the force being applied by the slave member. Such systems are referred to as bilateral because of the addition of the force feedback in the system. To this end the master actuator 20 is provided. The master actuator includes a cylinder element 40 and a piston element 41 movable therein and also includes a pair of ports 35 and 36, one connected to each of the ends of the cylinder 40. The cylinder 40 is connected over a mechanical link 42 to a point on the slave member 15 intermediate the ends thereof. The stem 43 attached to piston 41 is pivotally connected to an intermediate point of the master member 10. The cylinder of the master actuator and the cylinder of the hydromechanical control valve are mechanically interconnected over link 44. The mechanical elements 40 and 43 of the master actuator are oriented in respect to the slave and master member and the pressure appearing across the slave actuator 19 is coupled to the pressure applied to the ports of the master actuator 20 such that the force applied by the master actuator to the master member is opposite and reduced in magnitude to the corresponding slave member force. It will be appreciated that the torque developed by the slave member may be, for example, a hundred times greater than the feedback torque through the slave loop over link 39 appearing on the master member. Even though the torque reduction in feedback is by a factor of, say, one hundred, the torque fed back through the master actuator is not reduced nearly in such a ratio. Accordingly, the high gain of the hydromechanical control valve along with the substantial feedback in the force feedback path of the master actuator usually leads to instabilities in the master loop circuit. In the master loop the phase and amplitude of signal at the output of the control valve fed back through the master actuator to the input circuit of the control valve are such as to support the buildup of oscillations in the loop over a band of frequencies in which it is desired to operate the system. In accordance with the present invention, means are provided for restricting the flow in one or both of the paths in the ducts 35 and 38 connected between the master actuator and the slave actuator. While two restrictions are shown, one in some cases may be sufficient. The flow restrictions are in the form of orifices 45 and 46. The orifice may be made variable as suggested by the arrows through the orifices to provide the appropriate amount of resistance to fluid flow for reasons which will be explained below. The orifices 45 and 46 in conjunction with the master actuator 20 acts as a dashpot in the master loop which alters the amplitude and phase of signal feedback from the output of the control valve to the input thereof in a way which stabilizes the loop over the frequency range of operation thereof. The flow restriction in the ducts 35 and 38 should be such that the impedance of the mechanical input circuit of the hydromechanical control valve is reduced in magnitude in relation to the total output impedance appearing between the output and the inputs of the control valve through the feedback loop thereby to reduce the magnitude of the feedback and also to shift the phase so that the component of the feedback over the frequency of operation of the master loop is insufficient to sustain oscillations or foster buildup of oscillations. However, such impedance to flow should not be so great as would produce an appreciable lag in the transmission of pressure forces applied by the slave actuator to the master actuator. When such impedance is increased to the point where excessive restriction exists, a time lag occurs between the application of force by the slave member 15 to the time that such application is registered at the master member 10. Such action is self-defeating as a faithful replica of applied force is not felt at the master member and is not registered at the master member in close enough time correspondence.

The hydromechanical control valve 18 shown in FIG. 1 is a pressure control valve and includes a main cylinder 21 or housing. A spool 51 is provided in the main cylinder consisting of a shaft 52 and intermediate land 53 and a pair of end lands mounted thereon. The lands 53, 54, and 55 and the cylinder 21 form a pair of intermediate chambers 56 and 57 and a pair of end chambers 58 and 59. A pair of source ports 24 and 25 and a drain port 26 and a pair of output ports 22 and 23 are located on the main cylinder. In the null position of the spool 51 the source ports 24 and 25 register with the end lands 54 and 55, respectively, and the drain port 26 registers with the intermediate land 53. Each of the output ports 22 and 23 is connected to respective intermediate chambers 56 and 57. A pair of centering springs 61 and 62 are located each in respective end chambers 58 and 59. The spring 61 is mounted in the end chamber between the end wall 63 and the land 54 and the spring 62 is mounted in the end chamber 59 between the end wall 64 and the land 55. In between the wall 63 and the spring 61 and in engagement with the spring is provided an end plate 65. The end plate 65 in turn engages one end of the shaft 17, the other end of which is pivotally connected to the master member 10. Also, at the other end of the control valve the end of the spring adjacent the end wall 64 engages a plate member 69 which in turn engages one end of the screw 66 threaded in the end wall 64. Screw 66 provides a fine adjustment for null setting of the control valve, that is for adjusting the forces produced by spring 62 to balance the force produced by spring 61 and maintain the spool 51 in the null position in the absence of an applied force to the control shaft 17. Negative feedback is applied from the intermediate chamber 56 to the end chamber 58 over the duct 67 and similarly negative feedback is applied from the chamber 57 to the end chamber 59 over duct 68.

In the operation of the control valve 18, with the spool 51 in the null position the pressures at the output ports 22 and 23 are equal. Moving the shaft 17 to the right compresses the spring 61 and forces the spool 51 to the right thereby allowing fluid to flow from the source port 25 through the output port 23 to one side of the slave actuator 19. Fluid from the other side of the slave actuator 19 flows into the port 22 and thence into the return port 26. The use of negative feedback converts a flow control valve into a pressure control valve and as such an input displacement produces a more controllable pressure output differential. The invention is particularly applicable in systems utilizing hydromechanical pressure control valves.

The invention has particular application in connection with apparatus such as manipulators described and claimed in patent application Ser. No. 33,442, filed Apr. 30, 1970, and assigned to the assignee of the present invention. In that application there is disclosed a slave member which is mounted to a slave support member and a master member which is mounted to a master support member. The slave support member is pivotable about a vertical axis in respect to a mount therefor. The master support member is mounted on the slave support member and is pivotal about another vertical axis. Movement of the master member in azimuth about the other vertical axis with respect to the slave support member causes the slave support member to move in azimuth and in correspondence therewith. Such action is achieved by means of a servosystem including a control valve mounted on the master support member, a slave actuator mounted to move the slave support member in azimuth with respect to a mount therefor, a master actuator mounted to apply force between the slave support member and the master support member and a cam fixedly mounted on the slave support member having a peripheral surface bearing on the control shaft of the control valve to cause a displacement thereof whenever the master support member moves with respect to the slave support member. Movement of the master member in azimuth about the one vertical axis causes a displacement of the input shaft of the control valve which energizes the slave actuator to cause a corresponding movement in azimuth of the slave support member. Such movement in turn is fed back by the mechanical coupling indicated between the master support member and the slave support member and by virtue of the pressure connections from the slave actuator to the master actuator to provide a force feedback of the force being exerted by the master.

While I have shown a particular embodiment of my invention, it will of course be understood that I do not wish to be limited thereto since many modifications may be made in the structural arrangement shown and in the instrumentalities employed. I contemplate by the appended claims to cover any such modifications as fall within the true spirit and scope of my invention.

What I claim as new and desire to secure by Letters Patent of the United States is:

1. In combination,
   a master member having an axis aligned coaxial with a predetermined axis,
   a slave member having another axis aligned coaxial with another predetermined axis corresponding to said one predetermined axis,
   a hydromechanical control valve having a mechanical input circuit and a pair of fluid flow output ports, said master member mechanically coupled to said mechanical input circuit for providing a mechanical input thereto,
   a slave hydraulic actuator having a pair of fluid flow input ports and a pair of mechanical output elements, each of said output ports of said valve hydraulically connected to a respective one of said input ports of said slave actuator, said slave member mechanically coupled to said pair of mechanical output elements of said slave actuator, said slave member mechanically coupled to said input circuit of said control valve whereby when a mechanical input from said master member is applied to the input circuit of said valve a portion of the output of said slave member is fed back into said input circuit in a direction opposed to said mechanical input, whereby an input from said master member to the input circuit of said control valve produces a mechanical output in said slave member which produces a change in the orientation of said other axis of said slave member in relation to said other predetermined axis to correspond with the orientation of said one axis of said master member in relation to said one predetermined axis, a master actuator having a pair of fluid input ports and a pair of mechanical output elements, each of said input ports of said master actuator connected to a respective one of said output ports of said control valve, one of said output elements of said master actuator pivotally connected to said master member and the other of said output elements connected to said slave member whereby the force exerted by said slave member is reflected to said master member reduced in magnitude and in a direction opposing the displacement which produce the mechanical input to said control valve to move said slave member, the inertia of said slave member being substantially greater than the inertia of said master member, the gain of said control valve being large whereby a small mechanical power input thereto produces a large fluid power output therefrom, and fluid flow resisting means in the circuit including the output ports of said valve and the input ports of said master actuator for providing sufficient resistance to fluid flow therein to reduce the amplitude of the mechanical output of said master actuator as applied to the input circuit of the control valve to preclude self-oscillation in said valve and master actuator loop, said resistance being insufficient to produce an appreciable lag in the transmission of force applied by said slave actuator to the master actuator.

2. The combination of claim 1 in which said fluid flow resisting means is an orifice.

3. The combination of claim 1 in which said fluid flow resisting means is a pair of orifices, each connected in fluid circuit between a master port and a corresponding slave port.

4. The combination of claim 1 in which said control valve is a pressure control valve.

5. The combination of claim 1 in which said master actuator is a linear hydraulic actuator.

* * * * *